United States Patent Office 2,877,201
Patented Mar. 10, 1959

2,877,201
WATER REPELLENT SILICON COMPOUNDS

Louis F. Bonza, La Crescenta, and Frank W. Thomas, Burbank, Calif., assignors to Lockheed Aircraft Corporation, Burbank, Calif.

No Drawing. Application March 3, 1955
Serial No. 492,044

10 Claims. (Cl. 260—33.6)

This invention relates to water repellent compounds or materials and it is an object of the invention to provide practical, effective, and inexpensive water repellents.

The water repellent compounds of this invention are suitable for application to aircraft windshields, to the windshields and windows of other vehicles, and are adapted for use on plastics, fabrics, metals, wood, paper, ceramics, ceramic tile and other materials and surfaces where it is desired to provide or impart water repellency. When employed as a coating for the windshields of aircraft the materials of the invention provide improved visibility during rain storms and other atmospheric disturbances, thus insuring greater safety during take-off and landing of the aircraft. When employed on the windshields and windows of automobiles and trucks the materials serve to increase visibility by imparting water repellency to the surfaces to the extent that the use of windshield wipers is not required. As already indicated, the compounds of the invention may be used on various surfaces to render them water repellent, for example they may be applied to the painted surfaces of automobiles, and the like, furniture, walls, and, in fact, to practically any surface where it is desired to provide or increase water repellency.

The water repellent compounds of the invention are suspensoids or liquid materials, preferably contained in a solvent or carrier, and are the reaction products of a halosilane or halosiloxane and a polyfunctional polyazine. The selected halosilane or halosiloxane is preferably dissolved or carried in a suitable diluent or reaction medium and the resultant mixture is reacted with the selected polyfunctional polyazine to produce what may be termed a polysilazine. The polymeric material in its carrier or dispersant or diluent is characterized by its exceptionally good adhesion to the surfaces of glass, and the like, and its resistance to the various common solvents such as alcohols, ketones, esters, nitric acid, toluene, etc. The water repellent compounds are also characterized by their ease of manufacture, low overall cost, and the facility in which they may be used or applied.

The water repellent compounds of the invention may be said to comprise the reaction product of an organic halo silicon compound and a polyfunctional polyazine, said silicone compound being in a selected carrier or diluent. The halosilicon organic compound, which is either a silane or siloxane, and the polyazine are used in the proportion range of from 1:5 to 5:1 mols while the diluent or carrier is employed in the proportion range of from 10 to 1000 parts by weight to 1 part by weight of the total halosilicon organic compound and polyazine.

The term "polyazine" as employed herein refers to a hydrazine and its derivatives, the azines and alkyl hydrazines (hydrazo compounds) and hydrazones, each of which has at least one functional hydrogen atom with or without unsaturation. These polyazines are all of the hydrazine class of compound and may be broadly classified as follows:

(1) Azines

R—CH=N—N=CHR where R is any alkyl group of at least one carbon atom up to 20 carbon atoms (2) Hydrazo compounds

R—HN—NHR where R is any alkyl group having at least one and not more than 20 carbon atoms (3) Hydrazones

R—C=N—NHR where R is any alkyl group of at least one and not more than 20 carbon atoms (4) Hydrazine

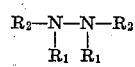
$$R_2-N-N-R_2$$
$$\phantom{R_2-}R_1\phantom{-N-}R_1$$

where R is a hydrogen atom and $R_2$ is a hydrogen atom or an alkyl group of at least one and not more than 20 carbon atoms (5) Polyaminohydrazines $$NH_2-NH-(NH)_n-NH_2$$

where $n=0$, 1 or 2.

The polyazines or polyfunctional polyazine compounds employed individually or in suitable mixtures in the preparation of the water repellents of the invention are:

1. Diazine (hydrazine)
2. Triazene
3. Tetrazene
4. 1,2-dimethylhydrazine
5. Phenyl hydrazine
6. 1-octadecyl hydrazine
7. 1-di-dodecyl hydrazine
8. 1-phenyl, 2 ethyl hydrazine
9. Di ethyl hydrazine
10. Di methyl hydrazone
11. 1,2-di-(aminoethyl) hydrazine
12. 1-amino propyl hydrazine
13. 1-methyl hydrazine Excellent results have been obtained when diazine is used in the preparation of the water repellent compounds as well as when 1,2-dimethyl hydrazine and/or 1-methyl hydrazine are employed.

A group or class of silanes or silicon compounds useful in preparing the water repellents is represented by the empirical formula—

$$Y-\underset{\underset{Z}{|}}{\overset{\overset{X}{|}}{Si}}-R$$

where R is a saturated or unsaturated aliphatic straight chain of from 1 to 30 carbon atoms, such as methyl, ethyl, etc., where X, Y may be either alkyl groups of from 1 to 5 carbon atoms or halogen atoms, and where Z is a halogen atom (chlorine, bromine, or iodine).

Typical examples of the organic halosilicon compounds of the silane class useful in preparing the water repellent compounds are:

1. Dimethyl dichlorosilane
2. Triethyl monochlorosilane
3. Dodecyl trichlorosilane
4. Octadecyl trichlorosilane
5. A saturated or unsaturated aliphatic straight chain trichlorosilane such that the compound is liquid and the aliphatic chain shall not exceed 30 carbon atoms Polysiloxanes or liquid halogenated polysiloxyl polymers represented by the following formula are also useful in preparing the water repellent:

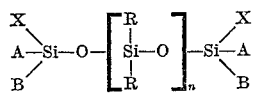

where X is a halogen, B and A are alkyl groups of from 1 to 10 carbon atoms, where R is a saturated or unsaturated aliphatic straight chain group of from 1 to 3 carbons or a halogen atom, and where $n$ is from 1 to 10. Examples of such polysiloxanes are:

1. $(CH_3)_2Cl\text{—}Si\text{—}O\text{—}Si(CH_3)_2\text{—}O\text{—}SiCl(CH_3)_2$
2. $(C_{10}H_{21})_2Cl\text{—}Si\text{—}O\text{—}Si(CH_3)_2\text{—}O\text{—}SiCl(C_2H_5)_2$ Another group of siloxanes that are adapted for use in the preparation of our compounds includes the cyclo halo polysiloxanes containing halogen atoms represented by the following empirical formula:

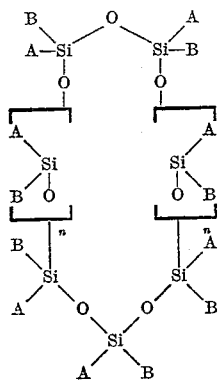

where A and B comprise at least two halogens and the remainder are methyl, ethyl, or propyl groups or mixtures thereof and where $n$ is from 1 to 5. Such cyclo polysiloxanes are exemplified by:

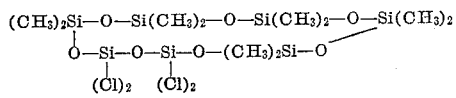

Alkyl polysilicon halides represented by the following formula represent another class of organic halosilicon compounds useful in preparing the water repellent—

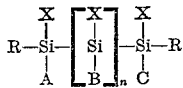

where R is any saturated or unsaturated aliphatic straight chain having from 1 to 20 carbon atoms, where X is a halide atom, A and B are alkyl groups of from 1 to 8 carbon atoms or halide atoms, where C is any halide alkyl ar trialkyl substituted silicon atom wherein the alkyl is in a carbon chain of from 1 to 4 atoms and where $n$ is from 1 to 20. Examples of alkyl polysilicon halides are:

1. $(CH_3)\text{—}Si(Cl)(CH_3)\text{—}Si(Cl)(CH_3)\text{—}SiCl(CH_3)_2$
2. $C_2H_5\text{—}Si(Cl)CH_3\text{—}SiClCH_3\text{—}SiClC_2H_5$ Alkoxy halosilanes may be employed in preparing the water repellent. These are represented by the general formula:

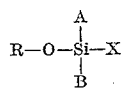

where R is any saturated or unsaturated straight chain aliphatic group of from 1 to 40 carbon atoms, A, B are halide atoms or alkyl groups (methyl, ethyl, and so on, to 10 carbon atoms) and where X is any halide atom. Representative of such alkoxy halosilanes are:

1. $(C_4H_9)\text{—}O\text{—}Si(CH_3)(Cl)_2$
2. $C_8H_{17}\text{—}O\text{—}Si\ CH_3(Cl)_2$ Another class of organic halosilicon compounds useful in formulating the water repellents comprises alkyl alkoxy halosilanes of the general formula—

where R is a saturated or unsaturated oxy aliphatic straight chain group such as methoxy, ethoxy, etc. up to octadecycloxy, where A represents an alkyl group of from 1 to 10 carbon atoms, where X is a halogen group and where B is an alkyl group or halogen group of from 1 to 10 carbon atoms or a hydrogen atom. Such saturated or unsaturated alkyl alkoxy halo silanes are exemplified by the following:

1. $C_2H_5\text{—}O\text{—}Si(CH_3)_2\ Cl$
2. $C_3H_7\text{—}O\text{—}Si(CH_3)_2\ Cl$ Still another class of organic halosilicon compounds that we may employ in preparing the water repellent materials are halo alkyl silanes of the general formula—

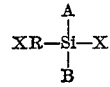

where X R are halo alkyl groups such as chloroethyl, etc. up to chloro octadecyl, where A and B are halide groups or alkyl groups such as ethyl and so on up to 10 carbons or a selected halide atom, and where X is a halide atom. Representative of this class of silanes are:

1. $ClC_2H_4\text{—}Si\text{—}CH_3(Cl)_2$
2. $BrC_4H_8\text{—}Si\text{—}C_2H_5(Cl)_2$ The solvents, diluents, carriers or reaction mediums employed in preparing the water repellents are liquid hydrocarbons having a boiling point of between 100° and 350° F. The reaction medium may be used in the amount of from 10 to 1000 parts by weight to 1 part by weight of the total reactants, a preferred proportion being 100 parts by weight to 1 part by weight of the total halo silicon and polyazine. Following application of the water repellent compound the dispersant or carrier evaporates so that the water repellent coatings of the invention remain, or are deposited, upon the surfaces to which they are applied by solvent release. The solvent-carriers or reaction mediums we have found to be most effective and practical are ligroin, toluene, benzene, octadecane, duodecane, tricosane, monane, and low boiling point blends of aliphatic and aromatic solvents such as Diluent "A" manufactured by the Shell Oil Company.

The polyazines employed in the reactant product of the invention each have at least one functional hydrogen atom and the halo organic silicon compounds each have at least one reactive halogen atom per molecule. Thus the reaction product is obtained as the result of the reaction of the functional hydrogen atoms of the polyazine and the halogen atom or atoms of the halo organic silicon compound. In preparing a typical water repellent of the invention the halosilane or other halo organic silicon compound is dissolved or dispersed in the solvent or carrier in the required or selected relative proportions. The polyazine in the selected amount is then added to the mixture or dispersion and the resultant reactive mixture is thoroughly agitated, stirred or shaken to effect as complete a reaction as possible between the polyazine and the halosilicon compound. The reaction product remains in solution or suspension in the reaction media which media serves as a carrier for the final product to facilitate its use or application. The water repellents may be prepared with the ingredients employed in the relative proportions or ranges of proportions above specified. We have found a preferred range of proportions to be from 1 to 3 mols of the polyazine to 1 mol of the silicon compound and a rather generally useful preferred ratio to be 1½ mols of the polyazine to 1 mol of the organic halosilicon compound. It is desirable to exclude water from the several components during preparation of the water repellent materials and from the resultant product when it is subsequently packaged and stored. The water repellents of the invention are found to be insoluble in water and to be transparent when applied in thin films or coatings on glass, windshields, windows, etc. When the compounds are to be employed on transparent plastic enclosures, and the like, it is, of course, desirable to employ as the diluent or carrier, in the preparation of the compounds, materials that will not adversely affect such plastics. The water repellent compounds are package stable and may be packaged and applied either as a thin dispersion or as a paste. They may be sprayed from the well-known pressure type of bottle or package in which the window washing materials are commonly marketed, or applied by brushing, wiping, or in any other preferred manner. It will usually be preferred to apply the water repellents as thin coatings. When the material, as applied, dries and sets, that is when the volatile carrier is released through evaporation, the resultant water repellent coatings have excellent adhesion to practically all surfaces and are found to be enduring or long-lived and to retain their water repellency for long periods.

The following are typical preferred formulations for preparing the water repellent polymers or products of the invention:

Example 1

| | Mols |
|---|---|
| A. Diethyl dichlorosilane | 1 |
| B. Hydrazine | 1.5 |
| C. Ligroin, 20 parts by weight to 1 part by weight total of A and B. | |

Example 2

| | |
|---|---|
| A. Ethyl trichlorosilane | 1 |
| B. Hydrazine | 2 |
| C. Diluent "A" 20 parts by weight to 1 part by weight total of A and B. | |

Example 3

| | |
|---|---|
| A. Dodecyl trichlorosilane | 1 |
| B. Hydrazine | 1.2 |
| C. Diluent "A" 40 parts by weight to 1 part by weight total of A and B. | |

Example 4

| | |
|---|---|
| A. Octadecyl trichlorosilane | 1 |
| B. Hydrazine | 4 |
| C. Diluent "A" 60 parts by weight to 1 part by weight total of A and B. | |

Example 5

| | |
|---|---|
| A. Dioctyl dichlorosilane | 1 |
| B. Hydrazine | 5 |
| C. Ligroin 100 parts by weight to 1 part by weight total of A and B. | |

Example 6

| | |
|---|---|
| A. Methyl trichlorosilane | 2 |
| B. Hydrazine | 1 |
| C. Toluene, 20 parts by weight to 1 part by weight total of A and B. | |

Example 7

| | |
|---|---|
| A. Diethyl dichlorosilane | 3 |
| B. 1,2-dimethyl hydrazine | 1 |
| C. Diluent "A" 40 parts by weight to 1 part by weight total of A and B. | |

Example 8

| | Mols |
|---|---|
| A. Ethyl trichlorosilane | 1 |
| B. Octadecyl trichlorosilane | 1 |
| C. Trimethyl trichlorosilane | 1 |
| D. Hydrazine | 4 |
| E. Octane, 20 parts by weight total of A, B, C and D. | |

Example 9

| | |
|---|---|
| A. Ethyl hexyl dibromosilane | 2 |
| B. Hydrazine | 1 |
| C. Ethyl hydrazine | 1 |
| D. Octadecane, 100 parts by weight to 1 part by weight total of A, B and C. | |

Example 10

| | |
|---|---|
| A. Trimethyl chlorosilane | 1 |
| B. Dodecyl tribromosilane | 1 |
| C. Triazine | 1 |
| D. Hydrazine | 2 |
| E. Diluent "A" 50 parts by weight to 1 part by weight total of A, B, C and D. | |

Example 11

| | |
|---|---|
| A. $CH_3$—$SiCl_2$—$CH_2$—$SiCl_2$—$CH_3$ | 1 |
| B. Hydrazine | 1 |
| C. Diluent "A" 10 parts by weight to 1 part by weight total of A and B. | |

Example 12

| | |
|---|---|
| A. $CH_3$—$CH_2$—O—$SiCl_2$—O—$Si(CH_3)_2Cl$ | 1 |
| B. Dimethyl hydrazine | 3 |
| C. Ligroin, 50 parts by weight to 1 part by weight total of A and B. | |

Example 13

| | |
|---|---|
| A. Dodecyl trichlorosilane | 1 |
| B. Amino ethyl hydrazine | 1.5 |
| C. Diluent "A" 100 parts by weight to 1 part by weight total of A and B. | |

Example 14

| | |
|---|---|
| A. Ethyl, hexyl, octyl chlorosilane | 1 |
| B. Methylethyl hydrazine | 2 |
| C. Toluene, 50 parts by weight to 1 part by weight total of A and B. | |

Example 15

| | |
|---|---|
| A. Dichloroethyl dichlorosilane | 1 |
| B. Octyl hydrazine | ½ |
| C. Hydrazine | ½ |
| D. Diluent "A" 20 parts by weight to 1 part by weight total of A, B and C. | |

Example 16

| | |
|---|---|
| A. Cyclo halo methyl siloxane | 1 |

$$(SiCl_2—O)_x—[Si(CH_3)_2]_3—O$$

| | |
|---|---|
| B. Hydrazine | 4 |
| C. Ligroin, 10 parts by weight to 1 part by weight total of A and B. | |

Example 17

| | |
|---|---|
| A. Polysilane halide | 1 |

$$CH_3—CH_2—SiCl_2—CH_2—CH_2—SiCl_2(CH_3)$$

| | |
|---|---|
| B. Tetrazene | ⅛ |
| C. Hydrazine | 1 |
| D. Octadecane, 100 parts by weight to 1 part by weight total of A, B and C. | |

Example 18

A. Diethyl tetrachlorosilane _____ 1

$$CH_3CH_2—SiCl_2—SiCl_2—CH_2—CH_3$$

B. Hydrazine _____ 4
C. Ligroin, 100 parts by weight to 1 part by weight total of A and B.

Example 19

A. Dimethyl ethoxy chlorosilane_____ 1
B. Dimethyl hydrazine_____ 1
C. Octane 20 parts by weight to 1 part by weight total of A and B.

Example 20

A. Tetraethyl dichloridisiloxane_____ 1

$$(C_2H_5)_2—SiCl—O—SiCl—(C_2H_5)_2$$

B. Amyl hydrazine_____ 2
C. Ligroin, 10 parts by weight to 1 part by weight total of A and B.

It should be understood that the invention is not based or dependent upon the theories which we have expressed. Nor is the invention to be regarded as limited to the express procedure or materials set forth, these details being given only by way of illustration and to aid in clarifying the invention. We do not regard such specific details as essential to the invention except insofar as they are expressed by way of limitation in the following claims.

We claim:

1. A water repellent compound which is the reaction product of (a) a hydrocarbon-solvent soluble silicon compound selected from the group consisting of monosilanes, linear polysilanes and linear siloxanes, said monosilanes having the valences of the silicon atom of each silane satisfied by halogen and monovalent radicals selected from the group consisting of monovalent hydrocarbon oxy radicals containing at most 40 carbon atoms in their chains, and chloroalkyl radicals containing at most 10 carbons in their chains, at least three of the valences of said silicon atoms of each monosilane being satisfied by halogen and monovalent aliphatic hydrocarbon radicals, said polysilanes and said polysiloxanes having the valences of the silicon atoms of their polysilane and polysiloxane structures satisfied by halogen and monovalent aliphatic hydrocarbon radicals containing at most 20 carbon atoms in their chains, said siloxanes having at most 12 silicon atoms in their molecules, said polysilanes having at most 22 silicon atoms in their molecules, and (b) a linear aliphatic hydrazine compound having at least one functional hydrogen atom attached to each nitrogen atom, the silicon and hydrazine compound being in the proportional range of from 1:5 to 5:1 moles, dissolved in from 10 to 1,000 parts by weight of the total silane and hydrazine compound of a liquid hydrocarbon reaction medium having a boiling point of from 100 to 350 degrees F.

2. A water repellent compound which is the reaction product of dimethyl dichloro silane and a linear aliphatic hydrazine compound having at least one functional hydrogen atom attached to each nitrogen atom, the halo silane and hydrazine compound being in the proportion range of from 1:5 to 5:1 mols, dissolved in a liquid hydrocarbon reaction medium having a boiling point of from 100 to 350° F. in the amount of from 10 to 1,000 parts by weight to 1 part by weight total of the halo silane and hydrazine compound.

3. A water repellent compound which is the reaction product of triethyl monochloro silane and a linear aliphatic hydrazine compound having at least one functional hydrogen atom attached to each nitrogen atom, the triethyl monochloro silane and hydrazine compound being in the proportion range of from 1:5 to 5:1 mols, dissolved in from 10 to 1,000 parts by weight for each one part by weight of the total trichloro silane and hydrazine in a liquid hydrocarbon reaction medium having a boiling point of from 100 to 350° F.

4. A water repellent compound which is the reaction product of a saturated alkyl liquid trichloro silane wherein the alkyl chain does not exceed thirty and a linear aliphatic hydrazine compound having at least one functional hydrogen atom attached to each nitrogen atom, the trichloro silane and hydrazine compound being in the proportional range of from 1:5 to 5:1 mols, dissolved in from 10 to 1,000 parts by weight for each one part by weight of the total trichloro silane and hydrazine in a liquid hydrocarbon reaction medium having a boiling point of from 100 to 350° F.

5. A water repellent compound which is the reaction product of an unsaturated straight chain aliphatic liquid trichloro silane wherein the aliphatic chain does not exceed thirty and a linear aliphatic hydrazine compound having at least one functional hydrogen atom attached to each nitrogen atom, the trichloro silane and hydrazine compound being in the proportional range of from 1:5 to 5:1 mols, dissolved in a liquid hydrocarbon reaction medium having a boiling point of from 100 to 350° F. in the amount of from 10 to 1,000 parts by weight to one part by weight of the total silane and hydrazine compound.

6. The reaction product of a dodecyl trichlorosilane, and hydrazine, the dodecyl trichlorosilane and hydrazine being in the proportional range of 1:5 to 5:1 mols, dissolved in from 10 to 1,000 parts by weight for each one part by weight of the total trichlorosilane and hydrazine in a liquid hydrocarbon reaction medium having a boiling point of from 100° to 350° F.

7. A water repellent composition which is the reaction product of diethyl dichlorosilane, and hydrazine, the hydrazine being in the proportion of from 1.5 mols to 2 mols for each mol of the diethyl dichlorosilane, dissolved in approximately 20 parts by weight for each one part by weight of the total diethyl dichlorosilane and hydrazine in a liquid hydrocarbon reaction medium having a boiling point of from 100° to 350° F.

8. A water repellent composition which is the reaction product of dodecyl trichlorosilane, and hydrazine, the hydrazine being in the proportion of from 1.2 mols to 1 mol of the dodecyl trichlorosilane, dissolved in about 40 parts by weight to each one part by weight of the dodecyl trichlorosilane and hydrazine in a liquid hydrocarbon reaction medium having a boiling point of from 100° F. to 350° F.

9. A water repellent composition which is the reaction product of octadecyl trichlorosilane, and hydrazine, the hydrazine being in the proportion of from 1½ mols to 1 mol of the octadecyl trichlorosilane, dissolved in approximately 60 parts by weight to each part by weight of the total octadecyl trichlorosilane and hydrazine in a liquid hydrocarbon reaction medium having a boiling point of from 100° F. to 350° F.

10. A water repellent composition which is the reaction product of dioctyl trichlorosilane, and hydrazine, the hydrazine being in the proportion of from 5 mols to 1 mol of dioctyl dichlorosilane, dissolved in about 100 parts by weight of ligroin for each part by weight of the total dioctyl dichlorosilane and hydrazine.

References Cited in the file of this patent

Karrer: Organic Chemistry, Elsevier, 1938, pp. 747, 748, 762 and 763; Chemical Abstracts, vol. 41, 1947, pp. 5921 and 5925. (Copy in Sci. Library.)

Chemical & Eng. News, vol. 24, pp. 1233–1234, 1946. (Copy in Sci. Library.)